Nov. 25, 1930. M. WINTERHALTER Re. 17,881

FASTENING FOR FABRICS AND THE LIKE

Original Filed April 24, 1925

INVENTOR.
Martin Winterhalter
BY Marks & Clerk
ATTORNEYS.

Reissued Nov. 25, 1930 Re. 17,881

UNITED STATES PATENT OFFICE

MARTIN WINTERHALTER, OF HALLE-ON-THE-SAALE, GERMANY, ASSIGNOR, BY MESNE ASSIGNMENTS, TO MISHAWAKA RUBBER & WOOLEN MANUFACTURING COMPANY, OF MISHAWAKA, INDIANA, A CORPORATION OF INDIANA

FASTENING FOR FABRICS AND THE LIKE

Original No. 1,594,231, dated July 27, 1926, Serial No. 25,578, filed April 24, 1925, and in Great Britain December 31, 1924. Application for reissue filed October 7, 1926. Serial No. 140,186.

This invention relates to a detachable fastening for connecting the abutting edges of sheets of fabric, leather or the like and consists in the provision of a plurality of intermeshing plates connected alternately to the abutting edges and formed with interlocking ribs or elevations and recesses. The device is particularly suitable for use in fastening garments, footwear, bags, pouches and other articles and also in connection with the building up of tents and the like.

Fig. 1 of the accompanying drawings shows the fastener according to one form of construction, Fig. 2 is a perspective view of one of the plates or fastener elements of Fig. 1, and Fig. 3 is a plan of a plate or fastener element similar to that of Fig. 2, but formed with differently shaped interlocked elements.

Figure 1:
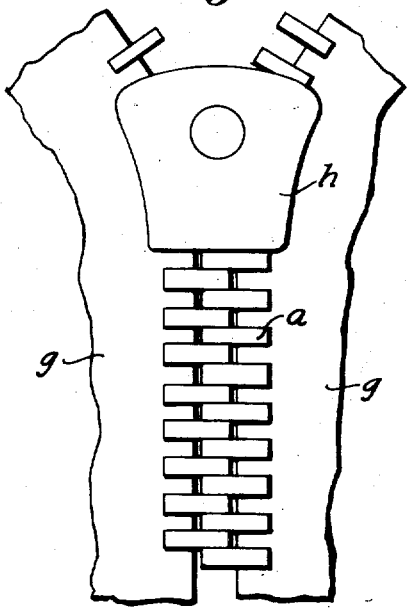
Figure 4:
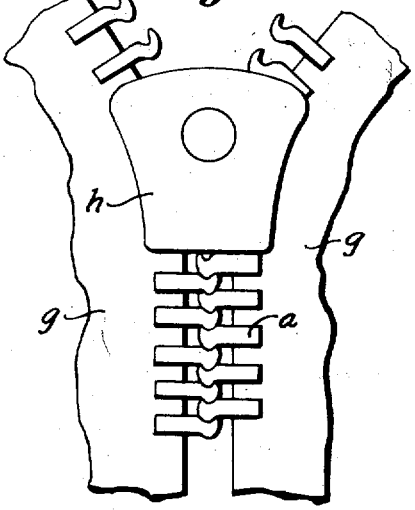
Fig. 4 is a view showing a modified construction of the fastener.
Figure 2:
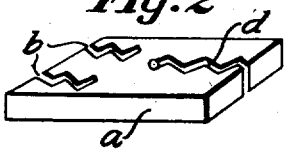
Figure 3:
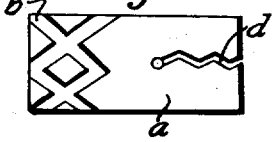
Figure 7:
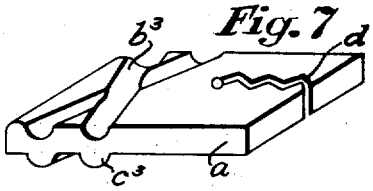
Fig. 7 is a perspective view of a plate or fastener element somewhat similar to those of Figs. 1, 2 and 3, but showing still further modifications.

The abutting edges of sheets of fabric or the like, for instance the different parts composing a garment, overshoe, tent or other article, fragmentary portions of which are indicated at $g$—$g$ in the drawing, are furnished with a plurality of fastener elements in the form of plates $a$ connected alternately to the opposite opposing edges of the parts $g$—$g$ so that they can intermesh as shown in Figs. 1 and 4. In the construction according to Fig. 1, the plates are formed at one side with a plurality of grooves or recesses of any suitable form, which are spaced apart to afford separate points of interlocking, and at the other side the element or plate is formed with corresponding ribs or spaced projections which are adapted to interlock with the recesses of an adjacent element or plate so as to prevent relative displacement in the plane of the plates. The recesses may be sinuous, as shown at $b$ in Fig. 2, or carried obliquely across each other, as shown at $b$ in Fig. 3, and the ribs or projections on the opposite sides of the plates are correspondingly formed in each case, or the plates may be formed at one side with two grooves $b^3$ extending obliquely across one another, as shown in Fig. 7 with correspondingly arranged oblique intersecting ribs $c^3$ at the other side of the plate.

Figure 5:
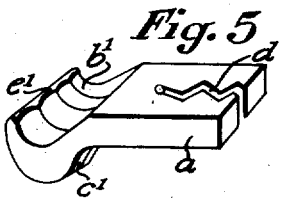
Figs. 5 and 6 are perspective views of individual plates or elements similar to those shown in Fig. 4, but each formed with different interlocking elements.
Figure 6:
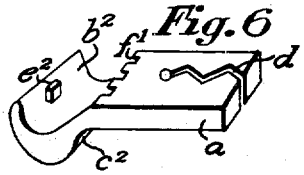

In the form of elements shown in Figs. 4, 5 and 6, the plate is formed adjacent the inner end which projects beyond the edge of the supporting part $g$, with a transverse corrugation affording a hook shaped end with a main rib or projection on one side and a main groove or recess in the other side for interlocking the opposed elements against direct separation, and these ribs and grooves extend from edge to edge of the element so as to afford interlocking engagement across the entire width of the plate.

In the structure of Fig. 5 the main groove is indicated at $b'$ and the main rib or projection at $c'$ and said main rib and groove are both fluted or corrugated crosswise or in the direction of the length of the element or plate so as to provide a plurality of minor grooves $e'$ in and transverse to the main groove $b'$ and corresponding minor ribs on and transverse to the main rib $c'$. With this construction, when opposed elements similar to that of Fig. 5 are interlocked and the hook shaped portions of the elements on one side engage between the hook shaped portions of adjoining elements on the other side, the so called minor ribs on the convex side $c'$ of the hook shaped end or main rib of each element engage in the so called minor grooves $e'$ in the main groove $b'$ of the adjoining element and this interengagement of the minor ribs and grooves locks the elements against lateral disengagement or slipping out of engagement sidewise.

Figure 8:
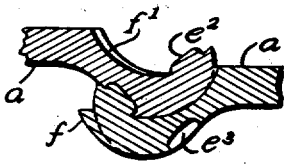
Fig. 8 is a longitudinal section of two engaging plates such as shown respectively in Fig. 6.

In the structure of Fig. 6, which is also shown in section in Fig. 8, the main groove is indicated at $b^2$ and the main rib at $c^2$. For holding interlocked elements of this form against side slipping or lateral displacement, each main groove $b^2$ is provided at one side and substantially midway between the lateral edges of the plate or element with an internal lug $e^2$ and each main rib $c^2$ is formed at the opposite side and substantially midway between the lateral edges of the element or plate with a seat or recess $e^3$ so that when the elements are interlocked, a lug $e^2$ on each element engages in a recess $e^3$ of an adjacent opposed element and thereby locks the connected element against relative lateral movement or sidewise disengagement. The elements may also be held against such disengagement by forming the end face of the element or forward side of the rib $c^2$ with a plurality of spaced ribs or teeth $f$ at intervals from edge to edge of the plate and at the opposite side the main groove $b^2$ has a plurality of correspondingly arranged grooves $f'$ cut therein into which the ribs or teeth $f$ of an opposed element engage when the opposed elements are nested or interlocked.

For mounting the elements or plates $a$ on the edges of the parts $g$ which are of fabric, leather or other flexible material and for insuring a secure and positive attachment, the outer end of the plate, that is, the end remote from the interlocking ribs and grooves is formed with a zig-zag or sinuous slit $d$ affording jaws at opposite sides with opposed matching serrated or toothed faces, and the edges of the fabric or other material $g$ is inserted in the slit $d$ and the jaws clamped thereagainst. In this way the interposed portions of material between the jaws is clamped in a zig-zag form corresponding to the slit $d$ and this insures a positive and secure locking of the elements or plates $a$ on the edges of the parts $g$.

A slider $h$ of usual form having divergent channels meeting in a single channel and with slits at the outer sides of the channels is slidable along the opposed series of elements $a$ in the usual manner and serves upon operation in one direction to bring the opposed series of elements together at an angle and thereby nest and interlock same while the reverse movement of said slider releases and separates the opposed elements.

I claim:

1. A device for connecting sheets of fabric or the like edge to edge, comprising a plurality of intermeshing plates connected alternately to opposite edges of said sheets of fabric, each of the plates being provided at one side with a plurality of grooves carried at an angle to each other and at the other side with ribs adapted to interlock with the grooves of the adjacent plate so as to prevent displacement in the planes of the plates.

2. A device for connecting sheets of fabric or the like edge to edge, comprising a plurality of intermeshing plates connected alternately to opposite edges of said sheets of fabric, each of the plates being provided at one side with intersecting grooves and at the other side with ribs adapted to interlock with the grooves of the adjacent plates so as to prevent displacement in the planes of the plates.

3. A device for connecting sheets of fabric or the like edge to edge, comprising a plurality of intermeshing plates having zigzag shaped slits in which to receive and clamp the edges of the sheets, alternate plates being connected to opposite sheets, each of the plates being provided at one side with grooves and at the other side with ribs adapted to interlock with the grooves of an adjacent plate so as to prevent displacement in the planes of the plates.

4. Separable fastenings for fabric, leather and the like, which fastenings are attached in rows along the edges of the material, and upon which a slider operates to open and close the series of fastenings and in which the individual units interlock with each other across the entire width of the units by means of grooves on the upper surfaces of the elements, said grooves opening through the lateral edges of the elements, and like projections on the under surfaces of the elements.

5. A device of the kind referred to for connecting sheets of fabric or the like edge to edge, comprising a plurality of intermeshing elements of substantial width each having a recess on one side opening through the lateral edges of the element and a projection on the other side whereby the opposed elements have an interlocking engagement across their entire width.

6. In a fastening device of the class described, the combination of opposed series of fastener elements and a slider operable therealong for interlocking and releasing same, said elements comprising relatively flat members having mounting means at their outer ends and said members being deformed in substantially the same place at each side and entirely thereacross adjacent their inner ends to form elevations on one side and recesses in the other side of said members whereby the opposed elements engage throughout their entire width against direct separation, and said deformations being of a form to hold the interlocked elements against separation in the direction of their width.

7. In a fastening device of the class described, the combination of opposed series of fastener elements and a slider operable therealong for interlocking and releasing same, said elements comprising elongated plates attached at their outer ends to a flexible support and each having a transverse corrugation extending entirely thereacross adjacent the inner end and forming an elevation on one side and an open ended depression in the other side whereby the opposed series of elements interlock against direct separation, and means between the ends of the corrugations for interlocking the elements against lateral separation.

8. In a fastening device of the class described, the combination of opposed series of fastener elements and a slider operable therealong for interlocking and releasing same, each of said elements being attached at its outer end to a flexible support and each having angularly related ribs and grooves at opposite sides thereof adjacent the inner end for interlocking the opposed elements against direct and lateral separation.

9. In a fastening device of the class described, the combination of opposed series of fastener elements and a slider operable therealong for interlocking and releasing same, said elements comprising substantially elongated flat members attached at their outer ends to a flexible support and each having adjacent its inner end a plurality of laterally spaced elevations and recesses at opposite sides to interlock with a pair of adjoining elements of the opposed series.

10. In a fastening device of the class described, the combination of opposed series of fastener elements and a slider operable therealong for interlocking and releasing same, said elements comprising substantially elongated flat members attached at their outer ends to a flexible support and each having adjacent its inner end a plurality of laterally spaced elevations on one side and corresponding recesses in the other side for interlocking the opposed elements against direct separation.

11. In a fastening device of the class described, the combination of a flexible support and a fastener element having means at one end for interlocking with an opposed fastener element and having at the other end a sinuous slit in which said flexible support is clamped for holding the fastener element thereon.

12. In a fastening device of the class described, the combination of a pair of flexible stringers, opposed series of separate fastener elements attached at their rear ends to the respective stringers and having diverging interlocking portions beyond the stringer superposed crosswise over divergent interlocking portions of the elements of the opposed series, and a slider operable along the series of elements for interlocking and releasing same.

13. In a fastening device of the class described, the combination of opposed series of fastener elements and a slider operable therealong for interlocking and releasing same, each element comprising a substantially flat member having ribs and grooves running both lengthwise and crosswise thereof whereby the elements of one series interlock between the elements of the other series against direct and lateral separation in the plane of the element.

14. In a fastening device of the class described, the combination of opposed series of fastener elements and a slider operable therealong for interlocking and releasing same, said elements having zigzag interlocking portions serving to interlock the opposed elements against both direct and lateral separation.

15. In a fastening device of the class described, the combination of opposed series of independently formed fastener elements and a slider operable therealong for interlocking and releasing same, said elements having elongated interlocking portions arranged in relative crisscross relation.

16. In a fastening device of the class described, the combination of opposed series of independently formed interlocking elements, supporting stringers on which the elements are mounted in spaced relation so as to receive the elements of the opposed series therebetween, and a slider operable along the two series of elements for interlocking and releasing same, said elements having interlocking portions intersecting at laterally spaced points.

17. In a fastening device of the class described, the combination of opposed series of elongated fastener elements having recesses and projections extending thereacross from edge to edge adjacent the inner end, a slider operable along the series of elements for interlocking and releasing the opposed elements, said recesses and projections being provided with offset portions for interlocking the elements against relative lateral movement.

18. In a fastening device of the class described, the combination of opposed series of fastener elements and a slider operable therealong for interlocking and releasing same, each of said fastener elements having interlocking means comprising spaced pairs of separate and independent projections and recesses at opposite sides respectively thereof.

19. In a fastening device of the class described, the combination of a series of fastener elements, each having mounting means at one end and having at the other end a plurality of projections on one side and a plurality of recesses in the other side, another series of fastener elements adapted to engage between and interlock with the elements of the first mentioned series, and a slider operable along the two series of elements for interlocking and releasing same.

20. In a fastening device of the class described, the combination of a series of fastener elements, each having mounting means at one end and having at the other end a plurality of laterally spaced projecting portions on one side and corresponding recessed portions in the other side, another series of fastener elements adapted to engage between and interlock with the elements of the first mentioned series, and a slider operable along the two series of elements for interlocking and releasing same.

21. In a fastening device of the class described, the combination of opposed series of interlocking elements wherein the adjoining elements of each series are spaced apart a suitable distance to receive single elements of the other series therebetween, and a slider operable along the two series of elements for interlocking and releasing same, each of said elements of one series having an elongated interlocking rib extending across the locking end of the element and extending rearwardly at each side of the center line of the element, and each of the elements of the other series having a rib extending over said interlocking portion of an opposed element and engaged therebehind and confined between the said rearwardly extending portions thereof.

22. In a flexible closure of the character described, the combination of a series of locking members each having at its forward end and in one face a pair of depressions with an integral portion of the member between the depressions, said portion being as high as the depressions are deep, and said member having on its opposite face and at its forward end, a pair of elevations corresponding in shape and in position to said depressions, another series of locking members adapted to engage between and interlock with the locking members of the first mentioned series and a slider operable along the two series of locking members for interlocking and releasing same.

23. A fastener of the class described comprising opposed series of spaced fastener elements and a slider operable therealong whereby the elements of one series are progressively engaged between elements of the other series, each of the elements of one series having a recess with intercommunicating angularly related branches and each of the elements of the other series being formed with a projection having angularly related portions corresponding to and seating in the recess and angularly related branches of the recess of an opposed element.

24. A fastener of the class described, comprising opposed series of spaced fastener elements and a slider operable therealong whereby the elements of one series are progressively engaged between elements of the other series, each of the elements of one series having a recess extending thereacross from edge to edge and with an opening therefrom through the forward edge of the element, and each of the elements of the other series having a formation corresponding to and seating in a recess and opening of an opposed element.

25. In a fastening device of the class described, the combination of opposed series of fastener elements and a slider operable therealong for interlocking and releasing same, said elements comprising elongated plates attached at their outer ends to a flexible support and having main projections and recesses at opposite sides thereof adjacent their inner ends which interlock the opposed elements against direct separation, said projections and recesses being formed between the lateral edges of the plates with interengaging auxiliary recesses and projections whereby the elements are interlocked against lateral separation.

DR. MARTIN WINTERHALTER.